(12) United States Patent
Stewart et al.

(10) Patent No.: US 8,097,163 B1
(45) Date of Patent: Jan. 17, 2012

(54) PURIFICATION OF OIL FIELD PRODUCTION WATER FOR BENEFICIAL USE

(75) Inventors: David R. Stewart, Fort Collins, CO (US); Lawrence Y. C. Leong, Orange, CA (US)

(73) Assignee: Produced Water Development, LLC, Fort Collins, CO (US)

( * ) Notice: Subject to any disclaimer, the term of this patent is extended or adjusted under 35 U.S.C. 154(b) by 294 days.

(21) Appl. No.: 11/784,569

(22) Filed: Apr. 6, 2007

Related U.S. Application Data (60) Provisional application No. 60/789,846, filed on Apr. 6, 2006.

(51) Int. Cl.
*B01D 61/58* (2006.01)
*B01D 61/00* (2006.01)

(52) U.S. Cl. ........ 210/653; 210/650; 210/652; 210/651; 210/628; 210/723; 210/408; 210/510.1

(58) Field of Classification Search .................. None
See application file for complete search history.

(56) References Cited

U.S. PATENT DOCUMENTS

| | | | | |
|---|---|---|---|---|
| 5,439,592 A | * | 8/1995 | Bellos et al. ................. | 210/651 |
| 5,512,167 A | * | 4/1996 | Gramms et al. ............. | 210/108 |
| 5,833,867 A | * | 11/1998 | Hensley ........................ | 210/792 |
| 5,965,029 A | * | 10/1999 | Simon et al. ................. | 210/663 |
| 7,520,993 B1 | | 4/2009 | Laraway et al. | |
| 2005/0284814 A1 | * | 12/2005 | Mairal et al. ................ | 210/644 |

OTHER PUBLICATIONS

Goldstein, Robert et al., "Use of Produced Water in Recirculating Cooling Systems at Public Service New Mexico's San Juan Generating Station," Electric Power Research Institute, Nov. 2, 2005, pp. 1-19.
Feeley, Thomas J., III et al., "A DOE R&D Response to Emerging Coal By-Product and Water Issues in the Electric-Utility Industry" Clean Coal and Power Conference, Washington DC, Nov. 17-19, 2003, pp. 1-17.
Takaichi, Lynn, "Produced Water Workshop: Can Technology Transform Produced Waters into New Supplies, at a Competitive Cost and Without Environmental Damage or Added Liability?" Kennedy/Jenks Consultants, Apr. 4, 2006, pp. 1-16.
Feeley, Thomas J., III et al., "Program Facts: Innovative Approaches and Technologies for Improved Power Plant Water Management" U.S. Department of Energy, Jan. 2005; pp. 1-4.
Atech Innovations GMBH, "Ceramic membranes for Microfiltration and Ultrafiltration" Environmental Expert S.L. 1999-2000, pp. 1-6.

(Continued)

*Primary Examiner* — Krishnan S Menon
(74) *Attorney, Agent, or Firm* — HolzerIPLaw, PC (57) ABSTRACT

A method and system for purifying production water obtained from oil and gas operations so that the purified water need not be disposed of by forced injection back into the geological formation but can be put to a beneficial use such as agriculture, irrigation, industrial or municipal or potable applications. The production water is treated in a ceramic microfilter after it has been pretreated (preferably by aeration and with a walnut shell filter) to remove volatile hydrocarbons and heavier oils, such as paraffins and asphaltenes, that could foul the ceramic filter. The permeate from the ceramic microfiltration can then be treated with activated charcoal or otherwise treated to meet the specific requirements for the intended beneficial use.

23 Claims, 3 Drawing Sheets

OTHER PUBLICATIONS

Wolfe, Dick, P.E., et al. "Water Rights and Beneficial Use of Coal Bed Methane Produced Water in Colorado" Colorado Division of Water Resources—Department of Natural Resources; Denver, Colorado, Oct. 2002, pp. 1-6.

All Consulting "Handbook on Coal Bed Methane Produced Water: Management and Beneficial Use Alternatives" Tulsa, Oklahoma, Jul. 2003, Chapters 4 and 5, pp. 4-1-4-40; 5-1-5-160.

Stewart, David R., Stewart Environmental Consultants, Inc., "Production Water—A New Water Resource? A Colorado Case Study," Produced Waters Workshop, Apr. 4-5, 2006, Colorado Water Resources Research Institute, Colorado State University, Information Series No. 102, pp. 1-23.

Takaichi, Lynn, "How Do We Squeeze Lemons, and What Do We Do With the Peels? Can technology transform produced waters into new supplies, at a competitive cost and without environmental damage or added liability?", Produced Waters Workshop, Apr. 4-5, 2006, Colorado Water Resources Research Institute, Colorado State University, Information Series No. 2, pp. 1-12.

Associated Press, "Court Mulls Water Dispute in Coal-Bed Gas Drilling," Sep. 11, 2008, Associated Press, 2 pages.

Funston, Roger et al., "Evaluation of Technical and Economic Feasibility of Treating Oilfield Produced Water to Create a "New" Water Resou7rce," Groundwater Protection Council, Produced Water Conference, Oct. 16-17, 2002, Colorado Springs, CO, pp. 1-14.

Burnett, David B., "Potential for Beneficial Use of Oil and Gas Produced Water," Global Petroleum Institute, Texas Water Resources Institute, 2004, Texas A&M University, pp. 1-11, http://www.rrc.state.tx.us/commissioners/williams/environment/beneficialuses.pdf.

Stewart, David R., Stewart Environmental Consultants, Inc., "Developing a New Water Resource from Production Water," International Petroleum Environmental Conference, Houston, TX, Nov. 2006, pp. 1-4, http://ipec.utulsa.edu/Conf2006/Papers/Stewart_18.pdf.

Oulette, Raymond et al., "Overview of Regulations for Potential Beneficial Use of Oilfield Produced Watewr in California," 12th Annual International Petroleum Environmental Conference, Nov. 2005, Kennedy/Jenks Consultants, pp. 1-16.

* cited by examiner

PURIFICATION OF OIL FIELD PRODUCTION WATER FOR BENEFICIAL USE

This application claims priority from provisional patent application Ser. No. 60/789,846 filed on Apr. 6, 2006.

I. FIELD OF THE INVENTION

This invention relates to a system and method for simply and economically producing agricultural augmentation water or potable water from oil production water. In particular, the invention relates to a system and process for microfiltration of production water so that it can be used beneficially, rather than being reinjected into the geological formation.

II. BACKGROUND OF THE INVENTION

Current water demands have prompted the investigation of alternative water sources and ways to augment current water supplies. It has been said that, "Nothing in the future will have a greater impact on our ability to sustain our way of life and preserve our environment for future generations than water." (*The Statewide Water Supply Initiative*, Colorado Department of Natural Resources.). These concerns transcend Colorado and the Western United States and apply to the world resource outlook in general.

One potential source of augmentation water is the water included in hydrocarbons extracted from geological formations containing oil and natural gas. The water included with the oil and/or gas produced from the well is termed "produced water" or "production water." Prior to this invention, production water had not been considered a potential source of augmentation water. Indeed, it was a difficult and expensive task just to make production water suitable for disposal.

Typically production water is separated from the hydrocarbons using an "API" oil water separator. The principle of the API separator is to allow for the non-aqueous phase liquids (primarily the organics which are lighter than water) to float to the surface. Then the organics are removed from the production water and concentrated through the use of a heat treatment unit, which drives off the remaining water through evaporation.

The API separator will recover the majority of the oil, but dissolved materials and volatile organics will remain in the aqueous segment. Thus, production water usually contains high concentrations of hydrocarbons and other inorganic constituents. Typically production water is disposed of by being re-injected under pressure back into the geologic formation, through a Class II injection well, permitted by the US EPA. Because of the contaminants in the production water, injection into other geological formations that can be used for a drinking water source or into surface water is usually prohibited. In addition, re-injection is costly because it requires substantial pressure (and, therefore energy) to overcome the resistance within the geological formation. The Department of Energy estimates that 30 to 40 percent of the energy obtained from the formation as oil is used to re-inject or move this water. (DOE—Sandia Conference, Salt Lake City, January 2006.) In addition, re-injection of production water into the formation dilutes subsequently-produced oil, adding additional costs to the recovery and processing of those hydrocarbons. Nevertheless, prior to the present invention, re-injection was the most straightforward method to dispose of production water, since it was quite difficult and costly to clean the production water sufficiently for direct discharge. "Direct discharge" is a term of art connoting discharge directly through a pipe to the surface water course or stream.

Thus, an efficient and effective treatment for upgrading production water would be beneficial both in providing high-quality water that can be used in various water conservation schemes and in avoiding the costs and other detriments of re-injecting the production water under ground.

As used herein "production water" means water separated from the production stream of oil and gas wells. An example of the constituents in a sample of production water from Wellington, Colo.—after API separation—is shown in Table 1

TABLE 1

Produced Water Quality Parameters After the Oil/Water Separation

| Process | Typical Range of Values mg/l | |
| --- | --- | --- |
| Inorganics | | |
| Total Dissolved Solids (TDS) | 1200 | 6000 |
| Total Hardness as CaCO3 | 30 | 300 |
| Total Alkalinity as CaCO3 | 1000 | 4000 |
| Chloride (Cl) | 40 | 1000 |
| Fluoride | <1 | 10 |
| Phosphate (PO4) | <0.5 | 30 |
| Nitrite+Nitrate-Nitrogen (NO2+NO3-N)* | <0.5 | 40 |
| Metals | | |
| Antimony (Sb) | <0.005 | 1.00 |
| Arsenic (As)* | <0.005 | 1.00 |
| Barium (Ba)* | 3.00 | 30.00 |
| Berylium (Be) | <0.0005 | 1.00 |
| Boron (B) | 1.00 | 10.00 |
| Cadmium (Cd) | <0.001 | 1.00 |
| Chromium (Cr) | <0.02 | 1.00 |
| Copper (Cu) | <0.01 | 1.00 |
| Iron (Fe)* | 0.10 | 30.00 |
| Lead (Pb) | <0.005 | 5.00 |
| Manganese (Mn)* | <0.005 | 10.00 |
| Mercury (Hg) | <0.0002 | 0.10 |
| Nickel (Ni)* | <0.05 | 10.00 |
| Selenium (Se) | <0.005 | 5.00 |
| Silver (Ag) | <0.01 | 5.00 |
| Thallium (Tl)* | <0.002 | 1.00 |
| Zinc (Zn) | <0.005 | 10.00 |
| Organics | | |
| Oil and grease* | 20.0 | 200.00 |
| Benzene* | 1.00 | 10.00 |
| Toluene* | 1.00 | 5.00 |
| Ethylbenzene* | 0.10 | 1.00 |
| Xylenes, total* | 1.00 | 5.00 |
| n-Butylbenzene* | 0.01 | 0.50 |
| sec-Butylbenzene* | 0.01 | 0.10 |
| tert-Butylbenzene* | 0.01 | 0.10 |
| Isopropylbenzene* | 0.01 | 0.10 |
| 4-Isopropyltoluene* | 0.01 | 0.10 |
| Naphthalene* | 0.01 | 0.10 |
| n-Propylbenzene* | 0.01 | 0.10 |
| 1,2,4-Trimethylbenzene* | 0.10 | 1.00 |
| 1,3,5-Trimethylbenzene* | 0.10 | 1.00 |
| Bromoform* | <0.001 | 1.00 |

This production water also contains paraffins and asphaltenes in an unmeasured, but not insignificant, amount.

Production water contains both inorganic and organic constituents that limit the discharge options available to the producer. Produced water contains a range of constituents including dispersed oil, dissolved or soluble organics, produced solids, scales (e.g., precipitated solids, gypsum ($CaSO_4$), barite ($BaSO_4$)), bacteria, metals, low pH, sulfates, naturally occurring radioactive materials (NORM), and chemicals added during extraction (Veil, et al., 2004). The oil related compounds include benzene, xylene, ethyl benzene, toluene, and other compounds of the type identified in the sample analysis shown in Table 1 and in other crude oil and natural gas sources. Normally, the production water will also contain metals, e.g., arsenic, barium, iron, sodium and other multivalent ions, which appear in many geological formations.

In order to produce a higher grade of water, for example, either "agricultural" or "augmentation" water, both the hydrocarbon components and heavy metals need to be removed. As used herein, "agricultural water" means water that will meet the basic standards dictated by the EPA or state agency as the primary agency for water quality in surface waters. "Potable water" means water that meets the primary and secondary drinking water standards as defined by 40 CFR Sec.136.

As used herein "augmentation water" means water that can be used to augment a water source, i.e., agricultural, industrial, municipal, irrigation or potable water. In a more restrictive sense it also means water that is supplied to keep a stream whole. In the nomenclature used for water rights in the Western portion of the United States "augmentation water" means water that protects individuals or water users that have a prior appropriation for the use of that water. A water augmentation plan is a procedure for replacing water to a stream system whose flows are depleted by the consumption of water, where the water user does not have a right to the water consumed. Consumption or "consumptive use" means the water has been placed in the evapo-transpiration cycle or otherwise not returned to the stream system. According to current ground water laws in the west with prior appropriation, if water under the land would reach a stream system within approximately 100 years, it is deemed to be "tributary" to that stream system; it supports the stream's flow. Other users may have rights to the stream flow; therefore, a new user cannot consume the water unless the new user has a "water right" (decreed by a Water Court or by a State Engineer) which allows their use of the water. Otherwise, a downstream user with senior water rights could be damaged because he might not have enough water for his purpose. So, absent a water right, the new user must figure out a way to replace or "augment" his water use so the existing stream flow remains the same as before he used it. Augmentation may be made by purchasing water rights on the affected stream system or by physically replacing the water used from another legal water source. An augmentation plan is submitted to the Water Court or State Engineer which governs the particular drainage basin in which the affected stream system lies. If the Court or State Engineer approves the plan, it will issue a decree which grants the use of the "tributary" water, provided that ongoing augmentation (replacement of used water) of that use occurs per the plan that is used by junior appropriators to obtain water supplies through terms and conditions approved by a water court that protect senior water rights from the depletions caused by the new diversions, under the Prior Appropriation Doctrine. Typically this will involve storing junior water when in priority and releasing that water when a call comes on; purchasing stored waters from federal entities or others to release when a river call comes on; or purchasing senior irrigation water rights and changing the use of those rights to off-set the new user's injury to the stream. These plans can be very complex and it is suggested that an engineering consultant be retained to allow for proper consideration of all hydrologic and water right factors.

Prior art methods of cleaning and upgrading production water have been ineffective and/or overly expensive. These methods include:

Oil Water Separation (API method): The normal method for oil water separation is the use of an API oil water separator. The principal of the API separator is to allow for the non-aqueous phase liquids ("NAPL's") to float to the surface. Then the organics or NAPL's are removed from the production water and concentrated through the use of a heat treatment unit. The oil water separator will recover a majority of the oils, but any dissolved materials in the remaining production water will not be removed by the API unit. Thus, the method is useful in recovering incremental amounts of oil from the production water, but is ineffective in removing other contaminants from the production water.

Precipitation: Precipitation is used for the removal of both dissolved oils and heavy metals. The precipitation will react with the dissolved oil and then flocculate and precipitate the oil into a particle. This particle can then be removed through floatation and filtration, i.e., the coagulant entraps both the metal and oil particles and makes them "bigger" so they can either float or be filtered from the solution. In some instances, it has been suggested to further clean the effluent from the precipitation stage by reverse osmosis. However, precipitation and filtration is still ineffective in removing volatile organic compounds, such as benzene. Further, processing would be required to remove those organic compounds.

Adsorption: Activated carbon adsorption has been used for many years as a method for the removal of dissolved organics. Activated carbon will remove organics typically below method detection limits listed in 40 CFR 136. However, this technology is very expensive, and it does not normally remove heavy metals.

Nano Filtration: Nano filtration has been used for the removal of sulfate ions in the field and has been shown to be very effective. However, this would require microfiltration and activated carbon for organic removal.

Organo-thiol ligands: The use of organo-thiol ligands has proved very promising in the removal of specific toxic heavy metals and dissolved organics from wastewater. However, they are very expensive and work on a limited number of metal ions.

SMZ Removal—Application of "surfactant modified zeolites" is also a technique utilized on produced waters for the removal of benzene, toluene, ethylbenzene, and xylene, i.e., "BTEX," and other volatile organics. The technique is most effective on benzene but is also effective on other organics. This technology does not remove heavy metals, unless they are associated with the organics being removed.

These prior art processes are all limited to certain aspects of cleaning up production water and do not present a comprehensive solution for upgrading production water to agricultural grade or potable water. Methods that have attempted to achieve that result comprise expensive multiple step processes that sequentially and separately attempt to address each problem in cleaning up production water. Thus, for example, one process of cleaning up production water included separate steps for: warm softening; coconut shell filtration; cooling (fin-fan); trickling filtration; pressure filtration; ion-exchange; and reverse osmosis. (R. Funston et al., "Evaluation of Technical and Economic Feasibility of Treating Oilfield Produced Water to Create a 'New' Water Resource," (Ground Water Production Council Conference, Produced Waters Workshop, Colorado Springs, Colo., October 2002.)

Obviously, there is a need for a simple, economic process to produce higher grade water such as agricultural and/or potable water, from oil and gas production water.

Although the following description and example are focused on production water from oil and gas wells, it is anticipated that the invention may also have applicability to production water from gas wells, and other similar water-containing hydrocarbon materials, such as coal bed methane water, obtained from geological formations.

III. SUMMARY OF THE INVENTION

The present invention provides both a method and system to produce agricultural grade or potable water from oil and gas production water. An important part of the process is the use of an appropriate ceramic filter to facilitate separation of hydrocarbons and other contaminants from the water. Appropriate pretreatment steps are used to assist in the initial separation and to remove materials from the process stream that would cause particular problems in fouling the ceramic filter. The water that passes through the ceramic filter may be subjected to additional treatments to "finish" the water for the particular application intended.

In one embodiment of the present invention production water from an API oil/water separator is treated by aeration and the aerated water is then subjected to filtering in a standard walnut shell filtration unit. The pre-treated water is then subjected to filtration with a ceramic filter to remove volatile organic compounds, e.g., benzene that may remain and should be removed. Any residual benzene in the permeate can be removed utilizing activated carbon. Alternatively, the benzene may be removed using surface modified zeolites of an appropriate mesh size, e.g., 14 to 100 mesh.

Purified water from the ceramic microfiltration step can then be discharged to the land surface as "agricultural water" or it can be sent to subsurface discharge. Because it has been purified, it need not be injected into a subterranean oil and gas formation normally at a depth of 4,000 to 5,000 feet.

Alternatively the discharge from the ceramic microfilter can be further treated by activated carbon adsorption, reverse osmosis and/or ion exchange treatment for further purification. Indeed, water from the ceramic filtration—and with or without one or more of these additional processes—may be deemed "potable."

IV. BRIEF DESCRIPTION OF THE DRAWINGS

The present invention may be more readily described by reference to the accompanying drawings in which.

V. DETAILED DESCRIPTION OF THE INVENTION AND A PREFERRED EMBODIMENT

Figure 1:
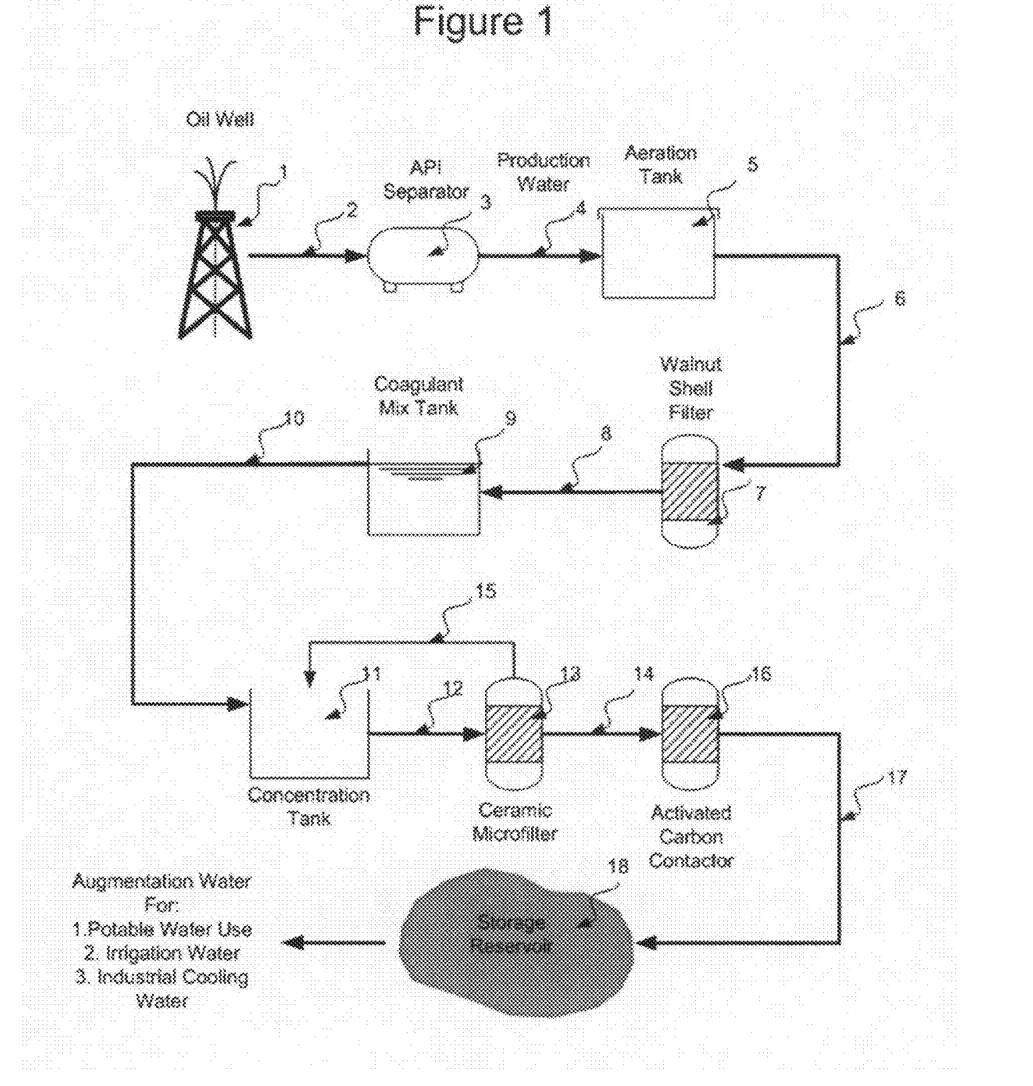
FIG. 1 is diagram of one embodiment of the production water purification process of the present invention.

One preferred embodiment of the present invention is depicted in FIG. 1 (a process schematic) and the following description.

Oil field production fluids 2 recovered from a well 1 are subjected to a separation process in a "knockout" tank or "API" separator unit 3 where water and oil separate under gravity conditions. Typical API units include water separation systems such as Envirex API Oil Water Separators available from US Filter Corporation recently acquired by Siemens AG and now known as "Siemens Water Technologies" headquartered in Warrendale, Pa. In addition it is desirable to add a "reverse breaker" to the knockout tank to assist in the removal and separation of emulsified oil. Appropriate "reverse breaker" compositions include a metal chloride, such as aluminum chloride, commercially available as "Petrolite" available from Baker Hughes Petroleum, Inc. in Sugar Land, Tex.

The oil overflow from the knockout tank is then processed through a heater treater unit (not depicted in FIG. 1) to improve the oil/water separation. The oil is stored in oil storage tanks for eventual sale. Usually, the water driven off in this process is vented to the air under permit from the EPA.

These initial steps, including the use of the "reverse breaker," are conventional procedures employed in the industry in removing water from the oil and gas recovered from the well. Typically the water with remaining oil and other contaminants is then reinjected into the geological formation. Instead, the present invention can be used to treat this water so that it can be employed beneficially as agricultural water, drinking water or in a number of other uses, e.g., cooling water for power generation plants and other processes.

In the present invention, the water underflow from the knockout tank, i.e., the production water 4, then flows to an aeration tank 5. The aeration process typically will have a large tank, with a hydraulic detention time of at least 60 minutes, but preferably 3 hours. This will utilize a fine bubble diffuser to strip the well head gasses from the API unit. There is a gas/liquid ratio that is determined in the laboratory for the best efficiency to achieve the desired water quality. The equipment is custom made. But the design of this equipment for this purpose is readily known to one of ordinary skill in the art without undue experimentation. Among other things, the aeration process is intended to remove carbon dioxide and hydrogen sulfide. Aeration also drives off volatile organic compounds ("VOCS") to the atmosphere, through a stripping process. The VOCs removed include the BTEX compounds.

Theoretically, the aerated production water 6 could then be subjected to microfiltration. However, in many applications, the aerated production water still contains a number of contaminants—especially organic compounds—that would rapidly impair the operation of the ceramic filter and would necessitate frequent cleaning with concomitant loss of production. Accordingly, it is highly desirable to send the aerated production water to a dissolved air flotation ("DAF") tank and/or organic filtration step to remove organics and any floating oils that might have been changed. This occurs because stripping of the VOCs, changes the organic contents, which change the overall reaction to the filters—i.e., the parafins are soluble with the VOCs present, but when the VOCs are stripped, then the parafins come out of solution due to the aeration step. These processes are intended to remove any heavy fraction (e.g., paraffins and asphaltenes) to non-detectable levels prior to ceramic microfiltration. If detectable amounts of paraffins and asphaltenes are included in the water treated by the ceramic microfilter, the ceramic microfilter will soon become fouled to the point of rendering that process inoperable. For example, in one test in which "walnut shell filtration" was not employed, the ceramic microfiltration process was rendered inoperable after only about four weeks of operation. The removal of these heavy oil fractions allows the ceramic filter to operate with acceptable run times (e.g., 2 to 3 days) between cleanings. This compares to run times of 12 to 20 hours without this pretreatment.

Accordingly, one preferred form of filtration is the use of a "walnut shell filter 7," to process aerated production water 6. The walnut shell filter appears to be particularly affective in removing paraffins and asphaltenes. Suitable walnut shell filters are manufactured by HydroFlow, Inc. of Maumee, Ohio or US Filter. Walnut shell filters normally have an automatic backwash system based on head-loss across the filter. A particularly suitable filter is the HydroFlow 125 available from HydroFlow, Inc., Maumee, Ohio.

The walnut shell filter may be preceded by the DAF process. The DAF (dissolved air floatation unit) is sometimes used to remove any dissolved air that has been injected and any oil that might have come through the system. This also allows for any additional sediment to settle out or float to the surface.

Also, it is possible to replace the DAF step by alternative designs. For example, if a DAF is not used, then a transfer pump can convey the water that passes through the walnut shell filter, i.e., filtered production water, 8 to a pretreatment tank or coagulant mix tank 9 where iron chloride coagulant can be added. The pH can be adjusted by the addition of caustic (NaOH), as required. In either case, the pretreated flow 10 from the mix tank then passes to the concentration tank 11. The solution 12 from the coagulation tank is subjected to crossflow ceramic microfiltration. If the iron chloride coagulant is employed, its use may result in the production of excess iron hydroxide solids, which would necessitate periodic blowdown to a sludge storage tank for subsequent dewatering via filter press. This step is necessary, because the iron hydroxide sludge cannot be disposed underground where it would fill void spaces and eventually clog the formation.

Generally, the process of the present invention will include either DAF or pretreatment and sludge filtration—but not both.

Waste from that DAF and the backwash water from the walnut shell filter is then sent to a Class II injection well for disposal. This backwash provides the cleaning of the filter. The run times for the walnut shell filter are typically 20 to 24 hours between backwashings.

The effluent 12 from the coagulation tank 11 is then subjected to crossflow ceramic microfiltration ("CMF") 13. Suitable membrane materials include titanium, alumina, and zirconium with a pore size of 0.5 microns to 1.2 microns. The elemental membrane may have an average pore size of 5 microns to 10 microns, although the average pore size is preferably from 0.05 micron to 5 microns. Most preferred is a method wherein the elemental membrane has an average pore size from 0.05 micron to 0.1 micron. The membranes are operated at pressures of 20 psi to 75 psi.

Suitable CMF filters include alumina membranes with zirconia coatings 0.01 micron pore size, 37 bore, 3.8 mm diameter, 1200 mm length available from ATECH Innovations, Gmbh, Gladbeck, Germany or US Filter.

Pretreated water 12 from the concentration tank 11 is fed into the feed port of the ceramic microfilter 13 modules where it passes tangentially over the membranes. The clean, filtered water permeates through the membranes and is collected in the shell of the module and removed through the permeate port. This filtered water is typically referred to as the "permeate" stream 14 and contains no or very low levels of oil and heavy metals. The solution that cannot permeate through the membrane flows down the length of the membranes, out the reject port, and back into the concentration tank. This stream is commonly referred to as the "reject" or "concentrate" stream 15 and contains a suspension of metal hydroxides and particulates. A small amount of the reject stream is typically wasted to the solids bleed line and sent to the oil sale tank in order to prevent the feed stream from becoming too concentrated with solids.

The inherent mechanical strength of the ceramic membranes allows for an on-line cleaning process, which is referred to as backpulsing. Backpulsing is a procedure by which a small amount of the permeate water is forced backwards through the membrane into the feed stream. This displaces solids adsorbed onto the surface of the membrane. Since the process pump continues to run during the backpulse, any solids displaced from the membrane surface are swept back into the concentration tank. Successful backpulsing depends on a sharp, high-pressure pulse of the permeate water backwards through the membrane. A separate "clean-in-place" ("CIP") unit is provided for the periodic cleaning of the microfilters by serial treatment with acidic solution, basic solution, an enzyme solution and a rinse. Suitable materials include sulfuric acid, sodium hydroxide, HOCl, and Ter-G-Zyme™ for routine cleanings. On occasion it may be necessary to use a heavy duty degreasing "syrup," i.e., BioSol™—MEGASOL to remove organic foulant(s), i.e., biological material(s) that are likely created in the aeration tank or walnut shell filter. Biosolve can remove this material and full recovery of the membranes is possible. BioSol™—MEGASOL is available from Evergreen Solutions, Inc., Calgary, Alberta, Canada.

The permeate stream 14 is monitored for pH level and turbidity to ensure that the oil and heavy metals are removed and the system is operating properly. A fluorescence meter is also used to monitor for organics and microbiological activity in the system. If any of the readings are improper (based on process characteristics identified herein or the intended use of the beneficial water), the permeate water is re-circulated to the precipitation tank and an alarm occurs until the condition is corrected. Bench mark readings for these process parameters, e.g., benzene, can be developed on site with laboratory verification for discharge parameters. Therefore, typical settings for these parameters will vary with each site and need to be field verified. This monitoring is within the skill of the art.

Non-hazardous waste from the ceramic microfiltration process is sent to a permitted land fill (not depicted on FIG. 1).

The process as described herein has focused on production water, i.e., water typically separated from the fluids obtained from wells producing oil and gas. This production water includes a number of materials that can substantially foul the ceramic microfilter and interfere with its economical operation. In other applications, such as coal bed methane, the raw material does not contain some of these contaminants, particularly the heavier oil fractions such as paraffins and asphaltenes. In those circumstances, the aqueous feedstock may only need to be aerated before the aerated effluent is treated by ceramic microfiltration. Treatment in the walnut shell filter or by DAF is not required. The permeate from the CMF is then treated by reverse osmosis or electrodialysis reversal ("EDR") to produce water having the requisite qualities for the intended beneficial purpose.

Depending on the particular production water involved and the beneficial use in which the water may be employed, the purified effluent 14 from the ceramic microfiltration 13 may not require any further processing. However, it is more likely that one or more final clean-up stages may be useful to achieve the highest beneficial use.

Figure 3:
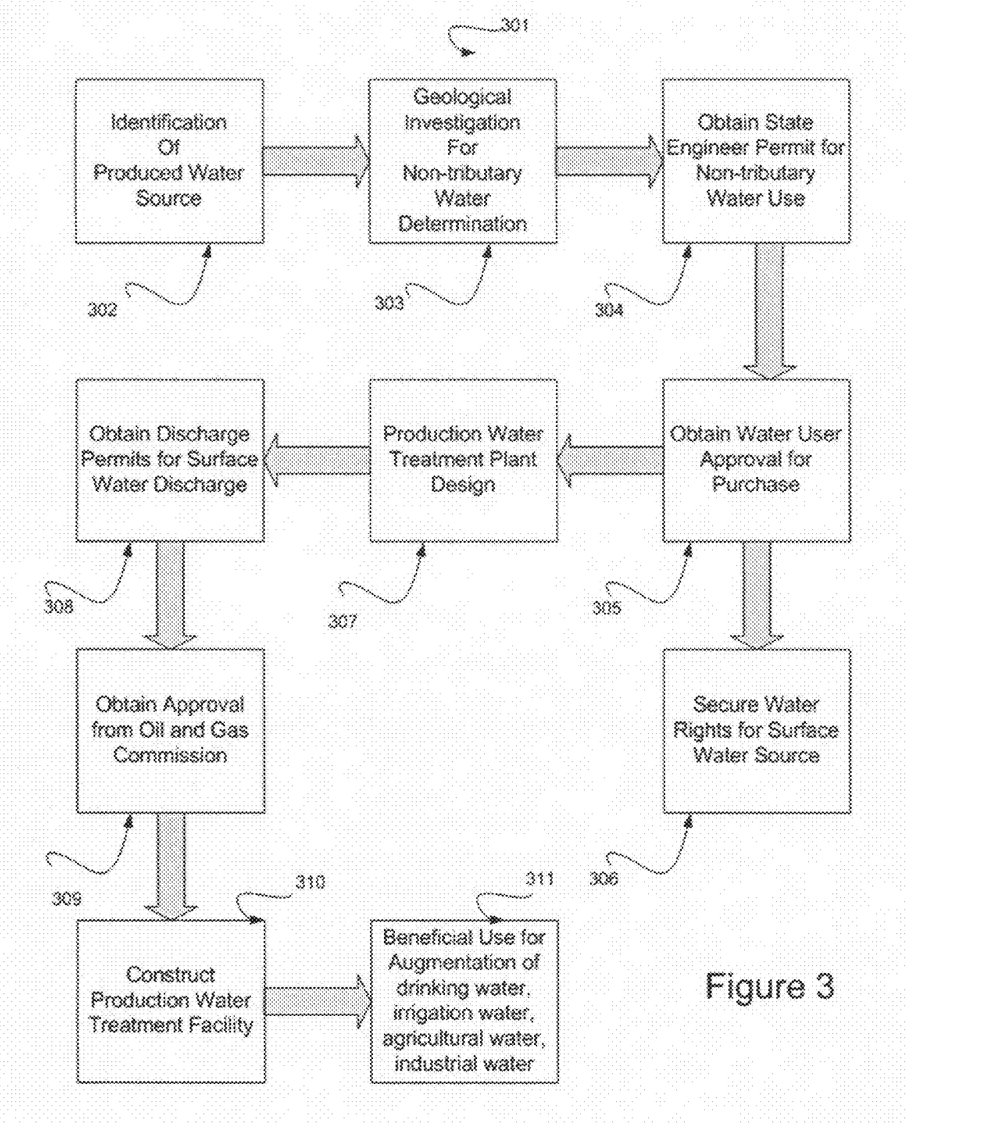
FIG. 3 is a diagram illustrating a typical engineering/legal process for establishing design criteria for the beneficial water to be derived from production water using the present invention.

The highest beneficial use of this water is augmentation water for water supplies. This can be done using the following process 301 as depicted in FIG. 3:

1. Once the production water source is identified, a geologic investigation can be performed to determine the non-tributary status of the water. FIG. 3, steps 302 and 303.
2. If interest is obtained FIG. 3, step 304, then the process can proceed to obtain permits for this water including the well permit from the state engineer, the discharge permit from the water quality control agency and the permit to discharge this water from the oil and gas commission. FIG. 3, step 304.
3. If the non-tributary status of this water can be verified, then potential users of the purified water can be identified. FIG. 3, step 305
4. Once the permits for discharge have been obtained, a facility can be designed and built using the process features described above. FIG. 3, steps 307 to 310.
5. A perpetual water right FIG. 3, step 306 can then be obtained from the state where the water is located to allow for the beneficial use of this water. FIG. 3, step 311

By performing the foregoing steps, it is possible to increase the value of the purified water by at least 10 times its original value.

In particular, it is anticipated that the permeate 14 from ceramic microfiltration 13 will be subjected to treatment with activated carbon in the contactor 16 to remove additional volatile organic compounds and to provide final filtration to produce purified water 17 for beneficial use. As shown in FIG. 1, this water is sent to storage reservoir 18 and may then be used for augmentation or another beneficial purpose. Suitable absorption units include pressure vessels (ASME vessels) available from US Filter. The empty bed contact time is typically 20 to 30 minutes. The mesh size is 20 to 40 mesh. The activated carbon base is typically coconut shells, but will depend on the actual VOCs being removed.

Other forms of post-filtration treatment can be employed depending on the quality of that water and the intended use. Additional post-treatment processes may be employed to further treat the water prior to discharge. These include membrane separation by reverse osmosis ("RO") and/or ion exchange ("IX"). The components that would be included in the RO process include booster pumping, scale inhibition, pH adjustment (acid/base), membrane separation and CIP using formulated cleaning agents. Components required for ion exchange include the exchange columns and regeneration using acid and base.

Acidic and basic wastes generated in the CIP of the CMS and the IX regeneration can be neutralized in tanks and then recycled through the full treatment process. Enzymes and detergents used in CMS and RO CIP can be collected and diverted to storage for eventual underground injection through a Class II injection. It does not go back into the formation that hydrocarbons are extracted from, but another formation. As described herein, this stream and several other streams containing contaminants may be re-injected back into the ground, but this is only a small portion of the production water, and the re-injection of this water can be accomplished at a fraction of the cost of re-injecting all of production water back into the ground.

Figure 2:
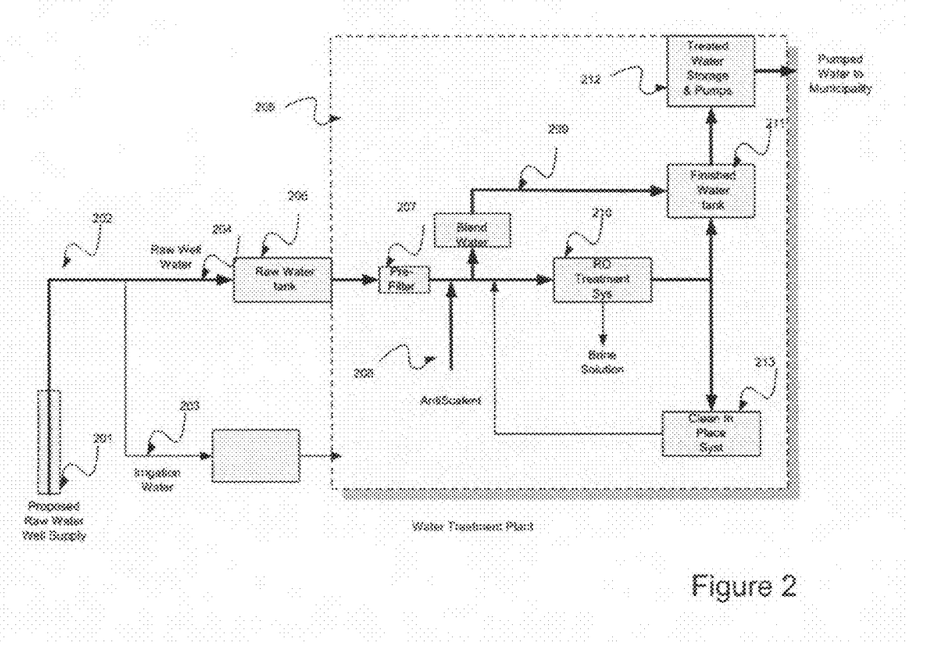
FIG. 2 is a diagram illustrating one embodiment of a supplemental reverse osmosis purification procedure.

FIG. 2 provides an illustration of the beneficial use of the purified production water. The production water, as mentioned in FIG. 1, can be augmentation water. This water is placed into a surface water or groundwater to augment the current water supply. This water 202 can then be pumped from this shallow groundwater 201 and can be used for: (1) irrigation water 203 and/or (2) raw water 204 for a potable water treatment plant 205. If option (1) is selected, then the water 203 is placed on crops for agricultural purposes. If option (2) is selected, then the water 204 is placed into a holding tank 206 for flow equalization. The next step is a pre-filtration 207 to remove any particulates. Normally, a caterage filter 207 will be utilized that has an effective removal of particles in the size of 1.0 microns or greater. This will remove any pathogens from the raw water. The next step is to treat the water for removal of any salts. This is accomplished through a reverse osmosis system. Normally antiscalants will be added to prevent clogging of the RO membrane 208. In addition, normally about 10 percent of the flow bypasses 209 the RO membranes. The RO System 210 will remove all salts, which will also remove the taste of the water. Through the bypass 209, it is possible to keep some of the salts for a TDS of approximately 300 mg/l. This will impart a good taste to the finished potable water system 211. From this location, a disinfectant 212 may be added to meet the USEPA standards for potable water. Some of the water 213 is saved for periodic cleaning of the membranes. Thus, FIG. 2 illustrates how purified production water, initially provided as augmentation water, can be put to better use.

VI. EXAMPLE

A treatment facility was constructed using water from an oil well in the Wellington field of Colorado. The test employed a typical API unit to provide a rough separation of liquid hydrocarbons from the production water. The test employed the following parameters:

a. The effluent from the API unit flowed into a 2500 bbl aeration flow equalization tank.

b. From the aeration tank, the water flowed to a DAF system sized for 250 gpm.

c. The water from the DAF flowed into the walnut shell filter for the removal of asphaltines and parafins.

d. The next step is the chemical feed tank. The chemical addition of ferric chloride was added to precipitate any heavy metals and emulsified oils within the system. The feed rate for the coagulation chemical ferric chloride varied between 80 to 120 mg/L. The chemical addition tank had a hydraulic retention time of 20 minutes.

e. From the chemical addition tank, the oil production water was pumped to the ceramic membrane having a pore size of 0.1 micron. The normal operating pressure of the CMF varied between 38 to 48 psi. This provided the physical separation of purified water from the oil and other contaminants including heavy metals.

e. The permeate from the ceramic membrane was then transferred to the activated carbon filtration system for final VOC removal.

f. During this test, a back pulse system was employed to allow for longer run times. This back pulse pushed the permeate water backwards through the membrane to clean it. This was performed approximately every 90 to 120 seconds. The backpulse pressure is normally between 400 to 500 psi over a period of less than 0.1 seconds. This creates a water hammer physically cleaning the membranes and allowing for longer run times.

Results demonstrated improved filter runs with reduced membrane fouling, and satisfactory reduction in VOC concentration, as shown in Table 2.

TABLE 2

W3 Produced water effluent quality (Stewart Environmental, 2004)
All results expressed in mg/L

|  | Raw Water | Treated Water |
|---|---|---|
| Inorganics | | |
| Total Dissolved Solids (TDS) | 2292 | 2370 |
| Total Suspended Solids (TSS) | 10 | <5 |
| Nitrite+Nitrate-Nitrogen ($NO_2$+$NO_3$-N) | <0.5 | 0.9 |
| Metals | | |
| Antimony (Sb) | <0.005 | <0.005 |
| Arsenic (As) | <0.005 | <0.005 |
| Barium (Ba) | 9.26 | 0.063 |
| Berylium (Be) | <0.001 | <0.00011 |
| Boron (B) | 2.76 | 2.42 |
| Cadmium (Cd) | <0.001 | <0.001 |
| Chromium (Cr) | <0.02 | <0.005 |
| Copper (Cu) | <0.01 | <0.01 |
| Iron (Fe) | 0.24 | 0.13 |
| Lead (Pb) | <0.005 | <0.005 |
| Manganese (Mn) | 0.031 | 0.040 |
| Mercury (Hg) | <0.0002 | <0.0002 |
| Nickel (Ni) | 0.04 | <0.02 |
| Selenium (Se) | <0.005 | <0.005 |
| Silver (Ag) | <0.01 | <0.005 |
| Thallium (Tl) | <0.002 | <0.002 |
| Zinc (Zn) | <0.005 | 0.052 |
| Organics | | |
| Oil and grease | 42 | <5 |
| Benzene | 2.45 | <0.001 |
| Toluene | 1.78 | <0.010 |
| Ethylbenzene | 0.428 | <0.010 |
| Xylenes, total | 1.989 | <0.010 |
| n-Butylbenzene | 0.043 | <0.010 |
| sec-Butylbenzene | 0.022 | <0.010 |
| tert-Butylbenzene | 0.037 | <0.010 |
| Isopropylbenzene | 0.065 | <0.010 |
| 4-Isopropyltoluene | 0.033 | <0.010 |
| Naphthalene | 0.134 | <0.010 |
| n-Propylbenzene | 0.076 | <0.010 |
| 1,2,4-Trimethylbenzene | 0.372 | <0.010 |
| 1,3,5-Trimethylbenzene | 0.356 | <0.010 |
| Bromoform | 0.480 | <0.010 |

The foregoing invention has been described with respect to certain preferred embodiments for use with oil and gas production water. It is anticipated that the general principles of the invention may be embodied in other forms of operating systems without departing from the spirit of the invention.

The invention claimed is:

1. A method of processing production water recovered from a geological formation to provide permeate water for a beneficial use, the method comprising:
   stripping volatile organic compounds from the production water via aeration to produce aerated production water, wherein the stripping causes paraffins and asphaltenes to come out of solution in the aerated production water;
   removing the paraffins and asphaltenes from the aerated production water to produce filtered production water;
   precipitating heavy metals and emulsified oils from the filtered production water using coagulation to produce pretreated production water; and
   subjecting the pretreated production water to filtration using a ceramic microfilter to produce the permeate water that is sufficiently purified for beneficial use, wherein the ceramic microfilter having 0.05-5 micron pore size and a zirconia coating of 0.01 micron pore size.

2. The method of claim 1 in which the removing of the paraffins and asphaltenes from the aerated production water includes treating the aerated production water with a walnut shell filter.

3. The method of claim 1 in which the permeate water is treated with activated carbon.

4. The method of claim 3 in which the permeate water passing through the activated charcoal is further treated by a process selected from the group consisting of reverse osmosis and ion exchange.

5. The method of claim 1 in which the filtration with a ceramic microfilter is conducted at a pressure of approximately 20 psi to 75 psi.

6. The method of claim 1 in which the filtration using a ceramic microfilter selected is conducted using a filter constructed of a material selected from the group consisting of titanium, alumina, and zirconium having an average pore size of 5 microns to 10 microns.

7. The method of claim 1 in which the filtration using a ceramic microfilter is conducted using a filter having an average pore size of 0.05 microns to 1 micron.

8. The method of claim 1 in which the beneficial use is selected from the group consisting of augmentation water, agricultural water, irrigation water, industrial water and potable water.

9. The method of claim 1 where the pH of the production water is adjusted to remove heavy metals by precipitation.

10. A method of purifying production water recovered from a geological formation to provide permeate water for a beneficial use, the method comprising:
    aerating the production water to produce aerated production water, wherein the aerating causes at least one of paraffins and asphaltenes to come out of solution in the aerated production water;
    filtering the aerated production water with a walnut shell filter to remove the at least one of paraffins and asphaltenes and to produce a filtered effluent;
    coagulating the filtered effluent to produce a solution;
    subjecting the solution to filtration using a ceramic microfilter to produce a permeate stream; wherein the ceramic microfilter having 0.05-5 micron pore size and a zirconia coating of 0.01 micron pore size; and
    treating the permeate stream with activated carbon to provide the permeate water that is sufficiently purified for beneficial use.

11. The method of claim 10 in which the permeate water for beneficial use is further treated by a process selected from the group consisting of reverse osmosis and ion exchange.

12. The method of claim 10 in which the filtration with a ceramic microfilter is conducted at a pressure of approximately 20 psi to 75 psi.

13. The method of claim 10 is which the filtration using a ceramic microfilter selected is conducted using a filter constructed of a material selected from the group consisting of titanium, alumina, and zirconium having an average pore size of 5 microns to 10 microns.

14. The method of claim 10 in which the filtration using a ceramic microfilter is conducted using a filter constructed of titanium, aluminum, and zirconium having an average pore size of 0.05 microns to 1 micron.

15. The method of claim 10 in which the beneficial use is selected from the group consisting of augmentation water, agricultural water, irrigation water, industrial water and potable water.

16. The method of claim 10 in which the ceramic microfilter is periodically treated with a cleaning agent.

17. A method of purifying production water recovered from a geological formation to provide permeate water for a beneficial use, the method comprising:
    aerating the separated production water to produce aerated production water, wherein the aerating causes at least one of paraffins and asphaltenes to come out of solution in the aerated production water;

filtering the aerated production water with a walnut shell filter to remove the at least one of paraffins and asphaltenes and to produce a filtered effluent;

coagulating the filtered effluent to produce a solution;

subjecting the solution to filtration at a pressure of approximately 20 psi to 75 psi using a ceramic microfilter filter having an average pore size of 5 microns to 10 microns to produce a permeate stream; wherein the ceramic microfilter having a zirconia coating of 0.01 micron pore size; and treating the permeate stream with activated carbon to provide the permate water that is sufficiently purified for beneficial use.

18. The method of claim 17 in which the filtration using a ceramic microfilter is conducted using a filter constructed of a material selected from the group consisting of titanium, alumina, and zirconium.

19. The method of claim 17 in which the permeate water for beneficial use is further treated by a process selected from the group consisting of reverse osmosis and ion exchange.

20. The method of claim 17 in which the filtration using a ceramic microfilter selected is conducted using a filter having an average pore size of 0.05 microns to 1 micron.

21. The method of claim 17 in which the beneficial use is selected from the group consisting of augmentation water, agricultural water, irrigation water, industrial water and potable water.

22. The method of claim 17 in which the ceramic microfilter is periodically treated with a degreaser.

23. The method of claim 1 wherein removing paraffins and asphaltenes from the production water comprises a step of coagulation with iron chloride coagulant of pretreated production water.

* * * * *